(12) United States Patent
Tsai et al.

(10) Patent No.: US 8,392,820 B2
(45) Date of Patent: Mar. 5, 2013

(54) METHOD OF ESTABLISHING A PLAIN TEXT DOCUMENT FROM A HTML DOCUMENT

(75) Inventors: Hong-Yang Tsai, Taipei (TW); Chi-Hau Hung, Taipei (TW)

(73) Assignee: Esobi Inc., George Town, Grand (KY)

( * ) Notice: Subject to any disclaimer, the term of this patent is extended or adjusted under 35 U.S.C. 154(b) by 618 days.

(21) Appl. No.: 12/628,513

(22) Filed: Dec. 1, 2009

(65) Prior Publication Data

US 2010/0146381 A1 Jun. 10, 2010

(30) Foreign Application Priority Data

Dec. 1, 2008 (TW) ................................ 97146687 A (51) Int. Cl.
*G06F 17/00* (2006.01)
(52) U.S. Cl. .................. 715/229; 715/234; 715/239
(58) Field of Classification Search .................. 715/229, 715/234, 239
See application file for complete search history.

(56) References Cited

U.S. PATENT DOCUMENTS

| | | | |
|---|---|---|---|
| 6,654,758 B1 * | 11/2003 | Teague | 1/1 |
| 2005/0050044 A1 * | 3/2005 | Takagi et al. | 707/6 |
| 2005/0060643 A1 * | 3/2005 | Glass et al. | 715/501.1 |
| 2006/0206505 A1 * | 9/2006 | Hyder et al. | 707/100 |
| 2008/0201633 A1 * | 8/2008 | Huang et al. | 715/239 |

\* cited by examiner

*Primary Examiner* — Xuan Thai
*Assistant Examiner* — Nathan Hillery
(74) *Attorney, Agent, or Firm* — Rosenberg, Klein & Lee (57) ABSTRACT

The present invention provides a method of establishing a plain text document from a HTML document. The method including the steps of (A) acquiring a HTML document defined by HTML elements, each composed of tags and content between the tags; (B) pre-processing the HTML document by omitting some of the tags (including the content between those tags), whereby the rest of the HTML document comprises at least one target tag (including content between the target tags); (C) using a data structure to store the remaining tags of the pre-processed HTML document; (D) grouping the remaining tags (including the content between the remaining tags) stored in the data structure of the pre-processed HTML document into at least one target group according to the target tag(s); and (E) identifying the target group(s) most related to a title of the HTML document by comparing correlation(s) between the target group(s) and the title, and establishing a plain text document having the content of the identified target group.

15 Claims, 12 Drawing Sheets

Target group of tag <p>

Index 7.   BBBBBBB
Index 8.   CCC
Index 10.  EEEEEE
Index 11.  FFFF

Target group of tag <br>

Index 6.   AAAAA
Index 19.  GGGGG
Index 20.  HHHH

Index 1.  PPP
Index 2.  QQ
Index 3.  RR
Index 4.  SSS
Index 5.  TITLE
Index 6.  AAAAA
Index 7.  BBBBBBB
Index 8.  CCC
Index 9.  DDD
Index 10. EEEEEEE
Index 11. FFFF
Index 12. TT
Index 13. UUU
Index 14. VVVVV
Index 15. WWWW
Index 16. XXXXX
Index 17. YYY
Index 18. ZZZZZ
Index 19. GGGGG
Index 20. HHHH

FIG. 5A

Index 6.  AAAAA
Index 7.  BBBBBBB
Index 8.  CCC
Index 9.  DDD
Index 10. EEEEEEE
Index 11. FFFF
Index 12. TT
Index 13. UUU
Index 14. VVVVV
Index 15. WWWW
Index 16. XXXXX
Index 17. YYY
Index 18. ZZZZZ
Index 19. GGGGG
Index 20. HHHH

METHOD OF ESTABLISHING A PLAIN TEXT DOCUMENT FROM A HTML DOCUMENT

BACKGROUND OF THE INVENTION

1. Field of the Invention

The present invention is related to an extraction technique of web content, more particularly, to a method of establishing a plain text document from a HTML document, wherein the plain text document having contents most related to the title of the HTML document.

2. Description of the Prior Art

HTML documents are made readable by an internet browser displaying them in the form of web pages. In comparison with plain text documents, the HTML documents contain not only text but also tags and other forms of information, such as images or video clips. The content of web pages will be displayed by the internet browser according to the tags, whereby the web content could have rich and diverse information. However, with the size limit of display, it is inconvenient for users to read a complete web page on a portable computer device. Besides, in some applications, only an important part of the content on the web page is necessary, rather than the whole page. Therefore, the technique of extraction of text from HTML documents has been developed to support those devices and applications.

In Taiwan patent 434492, titled "Hyper text-to-speech conversion method", a hyper text markup language (HTML) analyzer is disclosed. The HTML analyzer reads and analyzes the input hyper text and divides it into a text content, a HTML tag for marking up the text structure, and an articulation control command for controlling the way of articulation. However, all the texts in the HTML document are extracted without further processing.

Taiwan patent publication 200813763, titled "System and method for multithreading analyzing web page", discloses a system based on a specific analyzing rule, determining whether an XML webpage contains a corresponding analyzing rule, then determining whether the XML webpage should be evaluated using an analyzing module, and determining the analyzed webpage meets the requirement of evaluation according to the criteria in the analyzing rule. The system increases the speed and efficiency of web content extraction. However, no detail of the analyzing rule is disclosed.

A well-known hyper text-to-pure text conversion techniques includes the steps of pre-processing the HTML document by omitting some irrelevant HTML elements, identifying the HTML element having the longest content in the pre-processed HTML document, shifting a current HTML element to a candidate HTML element having the contents with lengths longer than a predetermined threshold and having intervals with the longest HTML element smaller than a predetermined threshold, repeating the shifting step for the HTML elements ahead of and behind the longest HTML elements until there is no candidate HTML element, and respectively identifying the final current HTML element as a starting and ending HTML element, and using the contents of the starting and ending HTML elements, and those of the HTML elements between the starting and ending HTML elements as the content of the plain text document.

The hyper text-to-pure text conversion technique described above has the following drawbacks:

1. The plain text document may contain irrelevant sentences or words.
2. The first or last paragraph of the article in the webpage may be too short to be extracted.
3. Although the longest HTML element usually contains the important content of the webpage, but there are exceptions. For example, the content of news is the most important content of a webpage but have a length shorter than the content of an advertisement or other hyperlinked news titles in the webpage. In this case, the plain text document may contain only irrelevant sentences or words.

Therefore, extracting the texts from the webpage without further processing could not solve the problem in the prior art. Although the traditional extraction technique could establish a plain text document containing selected content from the webpage, it is probably that the selected content is irrelevant. An extraction technique which could establish a plain text document with content closely relevant to the title of the webpage is the most interested.

SUMMARY OF THE INVENTION

The object of the present invention is to provide a method of establishing a plain text document from a HTML document, wherein the plain text document only contains texts most relevant to the title of the HTML document.

The present invention provides a method of establishing a plain text document from a HTML document, comprising the steps of:

(A) acquiring a HTML document defined by HTML elements, each composed of tags and content between the tags;

(B) pre-processing the HTML document by omitting some of the tags (including the content between those tags), whereby the rest of the HTML document comprises at least one target tag (including content between the target tags);

(C) using a data structure to store the remaining tags of the pre-processed HTML document;

(D) grouping the remaining tags (including the content between the remaining tags) stored in the data structure of the pre-processed HTML document into at least one target group according to the target tag(s); and (E) identifying the target group(s) most related to a title of the HTML document by comparing correlation(s) between the target group(s) and the title, and establishing a plain text document having the content of the identified target group.

wherein the data structure may be an array, table or other forms of data structure which temporally stores relevant information.

The method further comprises identifying the title of the HTML document using the information stored in the data structure, and deleting the information about the HTML element containing the title and the information about the HTML element(s) ahead of the HTML element containing the title from the data structure before the step (D).

The Method Further Comprises the Steps of:

(D-11) sequentially searching for a first content near the target tag from the rest of the HTML document, and identifying the first content as a first base content;

(D-12) sequentially searching for next content near the target tag from the first base content, and if there is no next content near the target tag, implementing the step (D-15);

(D-13) if an interval between the next content of the step (D-12) and the base content is smaller than a predetermined threshold, identifying the next content of the step (D-12) as a current base content, and repeating the step (D-12), otherwise, implementing the step (D-14);

(D-14) grouping the first content and the current base content(s) into a target group, and identifying the next content as another first base content, implementing the step (D-12); and (D-15) grouping the first base content into one of the target groups.

The method further comprises the steps of identifying all the target tags and grouping the contents thereof into the target groups according to types of the target tags.

The Method Further Comprises the Steps of:

identifying the HTML element having the longest content in the pre-processed HTML document;

shifting a current HTML element to a candidate HTML element having the contents with lengths longer than a first predetermined threshold and having intervals with the longest HTML element smaller than a second predetermined threshold;

repeating the shifting step for the HTML elements ahead of the longest HTML elements until there is no candidate HTML element, and identifying the final current HTML element as a base content, and repeating the shifting step for the HTML elements behind the longest HTML elements until there is no candidate HTML element, and identifying the final current HTML element as an ending HTML element; and using the contents of the starting and ending HTML elements, and those of the HTML elements between the starting and ending HTML elements as the content of the target group.

The Method Further Comprises the Steps of:

(E-1) if there is no sub-group in the target group(s), identifying the target group most related to the title of the HTML document by comparing correlation(s) between the target group(s) and the title;

(E-2) calculating similarities of the other target groups to the most title-related target group based on a vector space model to identify the target groups having the similarities higher than a predetermined threshold, and establishing the plain text document having the content of the identified target groups;

(E-3) if there is (are) sub-group(s) in the target group(s), identifying the sub-group most related to the title of the HTML document by comparing correlation(s) between the sub-groups and the title;

(E-4) if there is only one sub-group, establishing the plain text document having the content of the identified sub-group; and (E-5) if there are more than one sub-groups, calculating similarities of the other sub-groups to the most title-related sub-group based on a vector space model to identify the sub-groups having the similarities higher than a predetermined threshold, and establishing the plain text document having the content of the identified sub-groups Thus, the method according to present invention has one or more of the following advantages:

(1) The irrelevant content in the HTML document will not be extracted into the plain text document since they are definitely not the content of the target tag.

(2) Short but relevant contents in the HTML document will be extracted while long but irrelevant contents won't be extracted since it is the type of HTML element which determines the contents to be extracted, rather than their lengths.

(3) By deleting the information about the HTML element containing the title and the information about the HTML element(s) ahead of the HTML element containing the title from the data structure, the amount of data to be processed is reduced, which increases the efficiency of processing.

(4) To identify the most relevant content by correlation and similarity comparison based on a vector space model increases the accuracy of selection of the content to be extracted.

The title of the HTML document may be HTML Title tag, item title of RSS feed or summary of RSS feed.

DETAILED DESCRIPTION OF PREFERRED EMBODIMENTS

Figure 1:
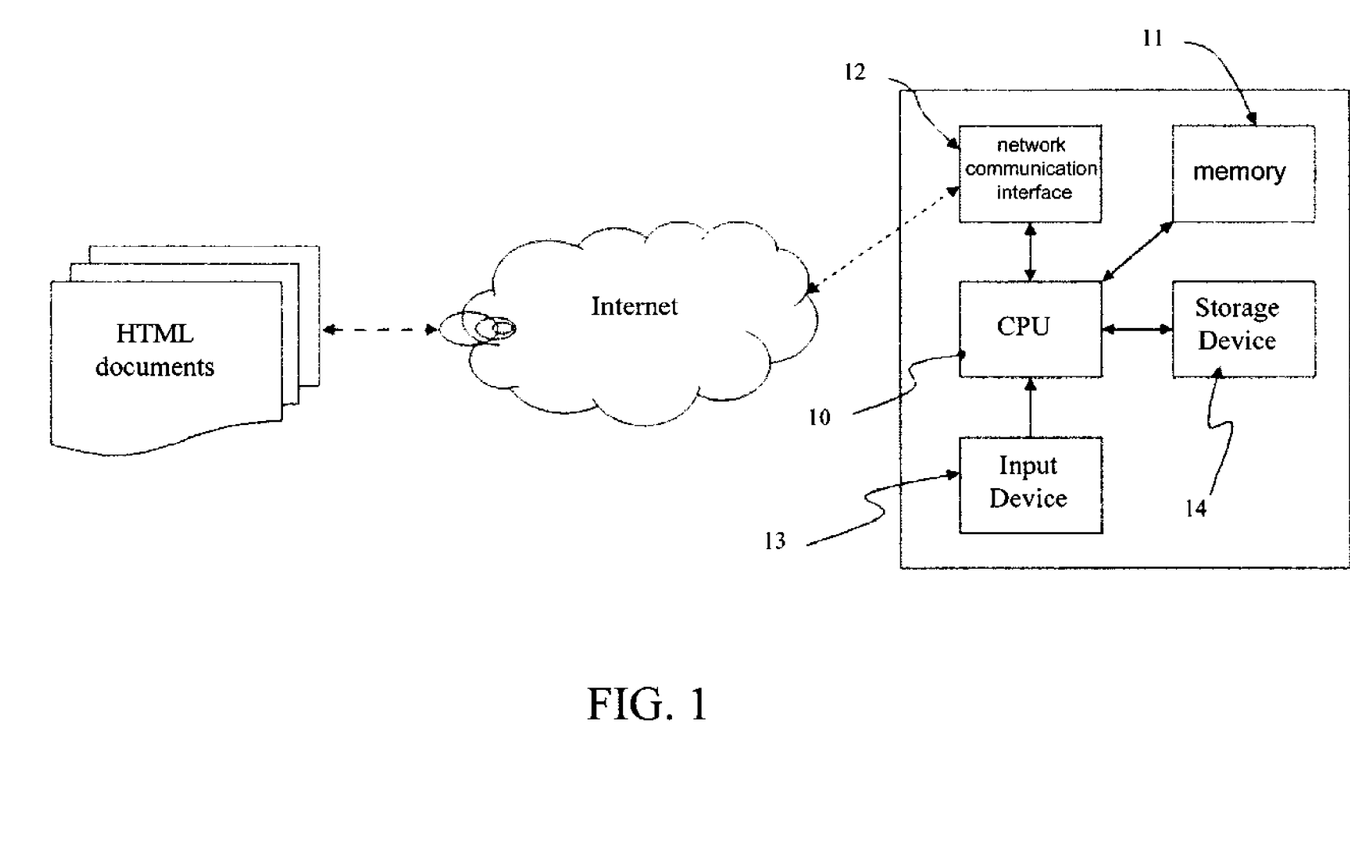
FIG. 1 shows a computer system implementing a method of establishing a plain text document from a HTML document according to one embodiment of the present invention.

FIG. 1 shows a computer system implementing a method of establishing a plain text document from a HTML document according to one embodiment of the present invention. The computer system includes a CPU 10, a memory 11, network communication interface 12, input device 13 (such as a keyboard and mouse) and a storage device 14. These components of the computer system communicate to each other. The storage device 14 may be a hard disk or other media readable by a computer for storing data and the process implementing the method of the invention. The memory 11 mainly stores data and processes executed by the CPU 10. The CPU 10 executes the commands contained in the process and implementing data processing. The network communication interface 12 is connected to the Internet or a local area net, and may be preferably Ethernet card or other forms of network interface card.

Figure 2:
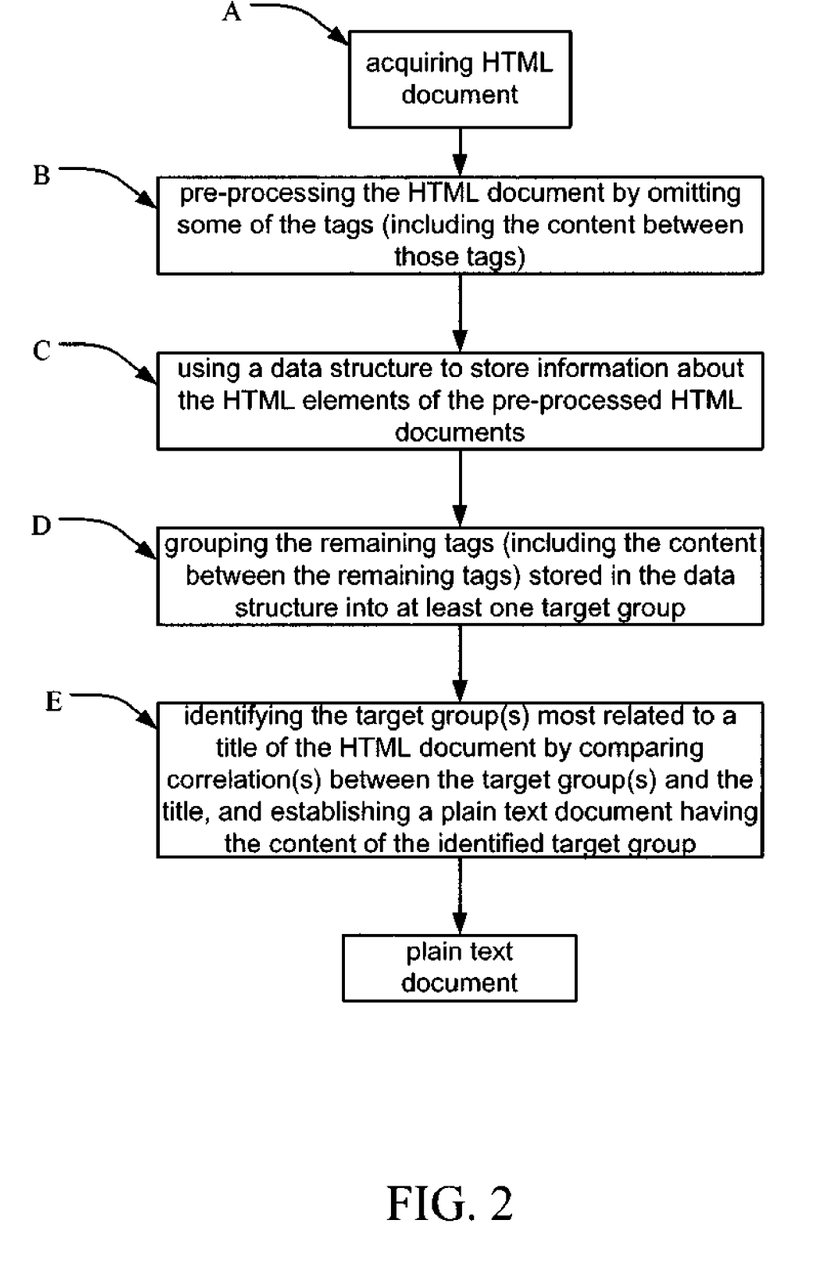
FIG. 2 is a flowchart showing a method of establishing a plain text document from a HTML document according to one embodiment of the present invention.

FIG. 2 is a flowchart of a method of establishing a plain text document from a HTML document according to one embodiment of the present invention. The method includes the steps of:

(A) acquiring a HTML document defined by HTML elements, each composed of tags and content between the tags;

(B) pre-processing the HTML document by omitting some of the tags (including the content between those tags), whereby the rest of the HTML document comprises at least one target tag (including content between the target tags);

(C) using a data structure to store the remaining tags of the pre-processed HTML document;

(D) grouping the remaining tags (including the content between the remaining tags) stored in the data structure of the pre-processed HTML document into at least one target group according to the target tag(s); and (E) identifying the target group(s) most related to a title of the HTML document by comparing correlation(s) between the target group(s) and the title, and establishing a plain text document having the content of the identified target group.

Moreover, the data structure further stores information about the rest of the HTML document of the pre-processed HTML document.

The purpose of the step B is to omit the irrelevant content in the HTML document. The HTML document contains HTML elements defined by starting tags, ending tags and contents between the staring and ending tags. These tags are in the form of <xxx> (starting tag) or </xxx> (ending tag), such as <a . . . >, </a>, <font . . . >, </font>. However, some of the HTML elements have no ending tag, such as the HTML element of Comment(<!-- -->) or Paragraph (<p>). The HTML document usually contains a large amount of HTML elements but only a part of them is relevant for the purpose of this invention. The pre-processing step B omits these irrelevant HTML elements by:

(B-1) retaining the tags <body> and </body>, and the content between the tags <body> and </body>;

(B-2) omitting the tags <!-- -->, and the content in the tags <!-- --> (The comment tag is used to insert a comment in the source code. A comment will be ignored by the browser. The comments explain the code, which can help the editors when they edit the source code at a later date. These comments are irrelevant for the purpose of this invention);

(B-3) omitting the tags <script> and </script>, and the content between the tags <script> and </script>;

(B-4) omitting the tags <style> and </style>, and the content between the tags <style> and </style>;

(B-5) omitting blank lines (The HTML document usually contains a large amount of blank lines); and (B-6) omitting hyperlink tags <a> and </a>, span tags <span> and </span>, and image tags <img>. The contents of the HTML elements of Hyperlink and Span are always relevant since they may be bolded or hyperlinked keywords. The image tags are always followed by images. These relevant content must be kept together so that their tags are omitted.

Example: <p>A black bear walked into a sandwich shop at B. C. of <a id="yui-gen0" class="ynwsyq yqclass" title="Canada" href=http://tw.news.yahoo.com/article/url/d/a/081005/1/17462.html?>Canada<a>, smelled at all the ingredients and left the shop after he found nothing delicious.</p>

The HTML document containing such HTML code will be displayed by the browser as "A black bear walked into a sandwich shop at B. C. of Canada, smelled at all the ingredients and left the shop after he found nothing delicious.". The hyperlink tags <a> and </a> appear near the word "Canada" since "Canada" is hyperlinked. If the hyperlink tags are not omitted, the sentence will be divided into three parts":
1. A black bear walked into a sandwich shop at B. C. of
2. Canada
3. smelled at all the ingredients and left the shop after he found nothing delicious This division is undesired. Therefore, it is necessary to omit the hyperlink and span tags to prevent undesired division of complete sentences.

Figure 3:
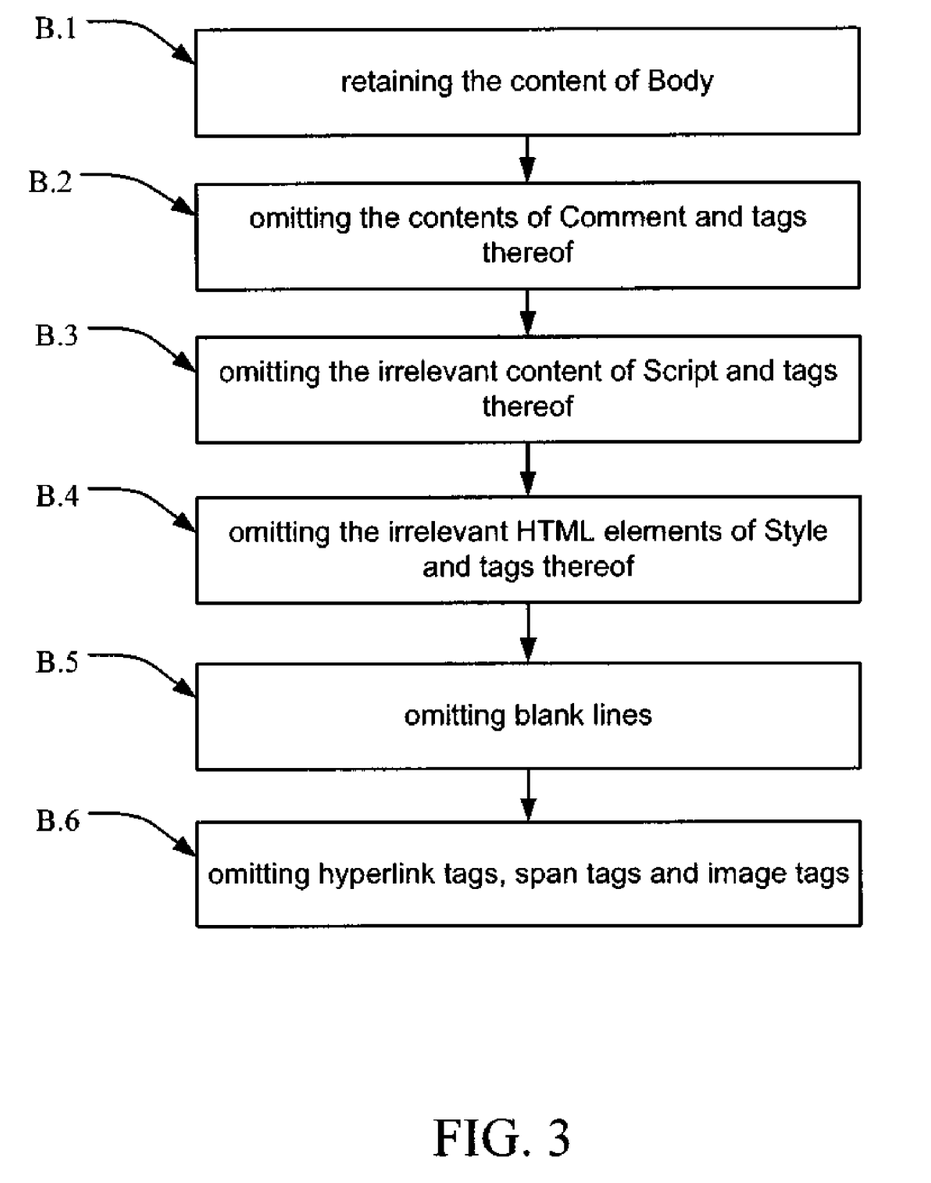
FIG. 3 is a flowchart showing a pre-processing method according to one embodiment of the present invention.

Generally, the contents of the HTML elements of Paragraph (<p>) or Line Break(<br>) are most relevant content for the purpose of this invention. Thus, the HTML elements of Paragraph and Line Break are identified as target tags. After the pre-processing step shown in FIG. 3 which omits the irrelevant HTML elements in the HTML document, the rest of the HTML document only contains the HTML elements of Paragraph and Line Break, and the other contents whose tags are omitted.

The following is an example for illustrating the step C shown in FIG. 2. In the example, the rest of the HTML document contains:

"<li>PPP</li>QQ<p>RR<p>SSS<h1>TITLE</h1><div><br>AAAAA</br><p>BBBBBBB</div><p>CCC<h2>DDD</h2><p>EEEEEEE<p>FFFF<div><li>TT</li><li>UUU</li><td>VVVVV</td><td>WWWW</td><td>XXXXX</td><li>YYY</li><li>ZZZZZ</li></div><br>GGGGG</br><br>HHHH</br>"

The contents "PPP", "QQ", "RR", "SSS", "TITLE", "AAAAA", "BBBBBBB", "CCC", "DDD", "EEEEEEE", "FFFF", "TT", "UUU", "VVVVV", "WWWW", "XXXXX", "YYY", "ZZZZZ", "GGGGG" and "HHHH" belong to different HTML elements, each following or followed by a different tag. Information about theses HTML elements is stored using a data structure and includes indices of the HTML elements, lengths of the contents and indications of target tags. The indices are serial numbers assigned to the HTML elements which can indicate a relative position of each HTML element. The data structure may be a table shown in Table 1.

TABLE 1

| Index | Length of content | Target element |
|-------|-------------------|----------------|
| 1     | 3                 | N              |
| 2     | 2                 | Y              |
| 3     | 2                 | Y              |
| 4     | 3                 | Y              |
| ...   | ...               | ...            |

Figures 5A, 5B:
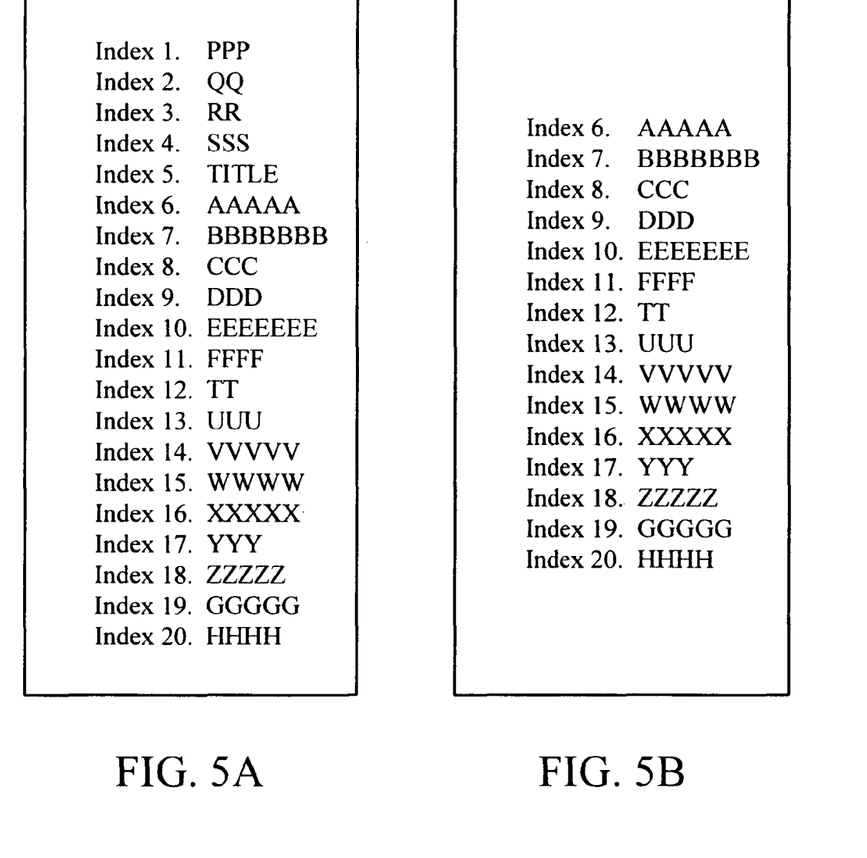
FIGS. 5A and 5B shows examples of the contents and their indices after the pre-processing step.

FIG. 5A shows an example of the contents and their indices after the pre-processing step.

In one embodiment of the present invention, the method further includes a step C-1 of deleting the information about the HTML element containing the title and the information about the HTML element(s) ahead of the HTML element containing the title from the data structure, which reduces the amount of data to be processed and increase the efficiency of processing.

Figure 4:
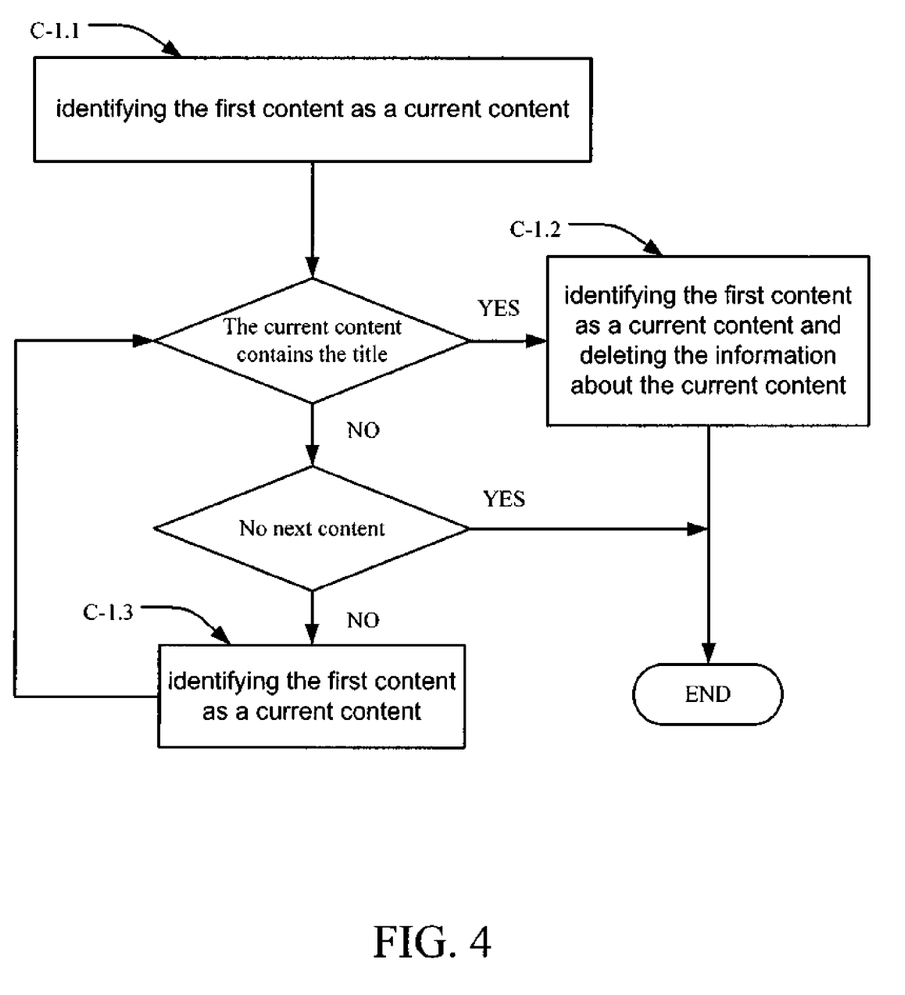
FIG. 4 is a flowchart showing a pre-processing method according to one embodiment of the present invention.

More specifically, FIG. 4 shows a flowchart of the step C-1 according to one embodiment of the invention which includes the steps of:

(C-1.1) identifying the first HTNL element as a current HTML element;

(C-1.2) determining whether the current HTML element contains the title, and if does, deleting the information about the current HTML element and the information about the HTML element(s) ahead of the current HTML element from the data structure; and (C-1.3) if the current HTML element does not contain the title, shifting the current HTML element to the next HTML element and repeating the step (C-1.2).

FIG. 5B shows the result after the step C-1. It is noted in FIG. 5B that the amount of data to be processed is reduced, which increases the efficiency and accuracy of the processing.

The steps D and E are also applicable to examples shown in FIGS. 5A and 5B.

Figure 6:
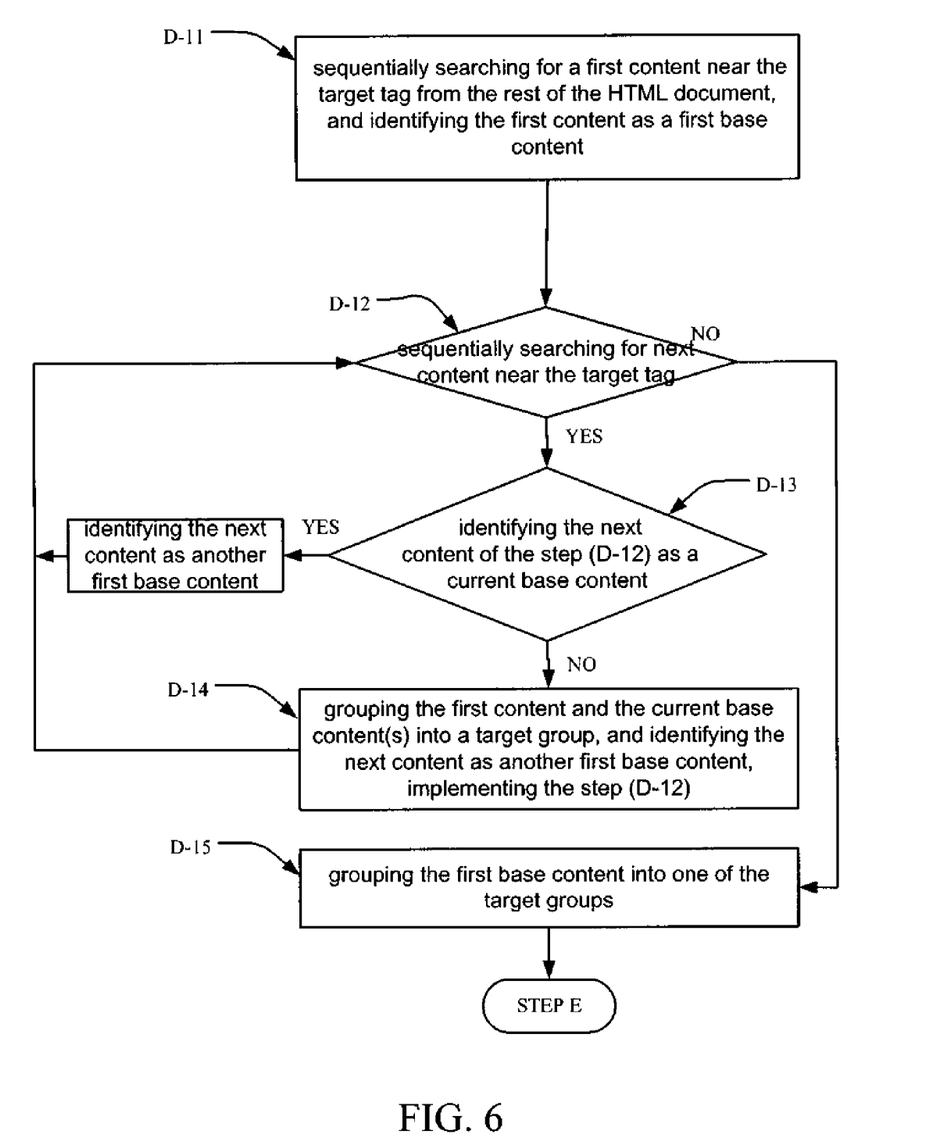
FIG. 6 shows a detail of the step D in FIG. 2 according to one embodiment of the present invention.

FIG. 6 shows a detail of the step D according to one embodiment of the present invention. The step D includes:

(D-11) sequentially searching for a first content near the target tag from the rest of the HTML document, and identifying the first content as a first base content;

(D-12) sequentially searching for next content near the target tag from the first base content, and if there is no next content near the target tag, implementing the step (D-15);

(D-13) if an interval between the next content of the step (D-12) and the base content is smaller than a predetermined threshold, identifying the next content of the step (D-12) as a current base content, and repeating the step (D-12), otherwise, implementing the step (D-14);

(D-14) grouping the first content and the current base content(s) into a target group, and identifying the next content as another first base content, implementing the step (D-12); and (D-15) grouping the first base content into one of the target groups.

By the steps D-11~D-15, the contents of the HTML elements having indices with a difference from that of the other HTML elements smaller than a predetermined threshold are grouped into one target group. The predetermined threshold is preferably 1~5. That is to say, the contents of the HTML elements having indices with a difference from that of the other HTML elements larger than the predetermined threshold are grouped into different target groups.

Figure 7:
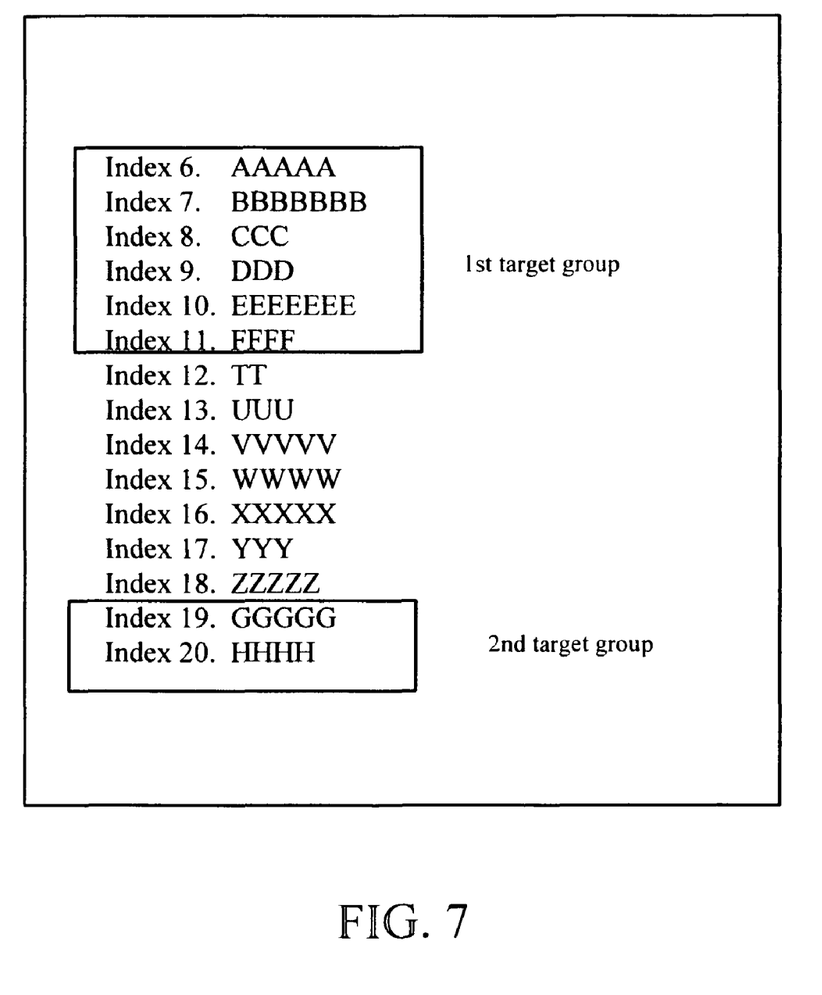
FIG. 7 shows the result after the steps D-11~D-15 in FIG. 6 according to one embodiment of the present invention.

It should be noted that the contents of the target tags, as well as the other HTML elements are grouped. For example, the content "DDD" shown in FIG. 5A will appear in the target group although it does not belong to a target tag (Paragraph or Line Break). FIG. 7 shows the result after the steps D-11~D-15, wherein there are a first and second target groups.

The correlation comparison described in the step E may be implemented by the techniques of word frequency count to identify the most relevant target group(s).

Figure 8:
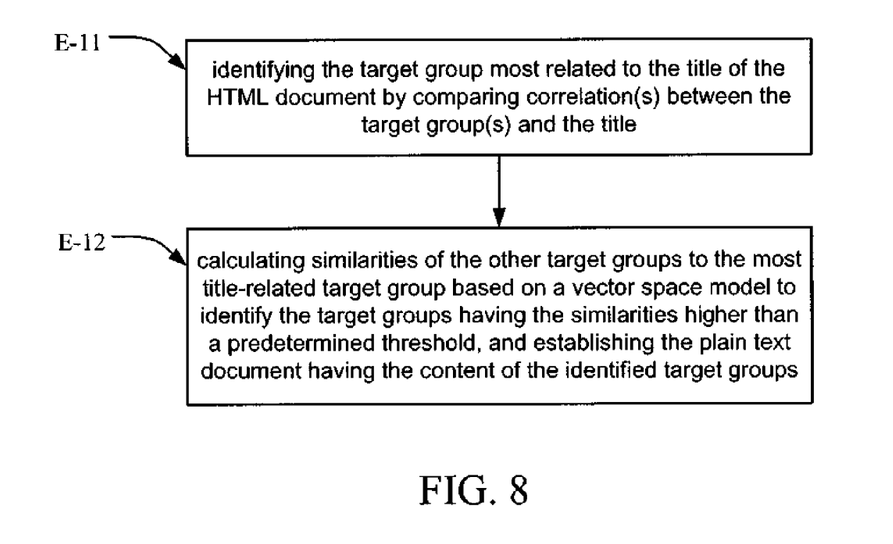
FIG. 8 is a flowchart showing a detail of the step E in FIG. 2 according to one embodiment of the present invention.
Figure 9:
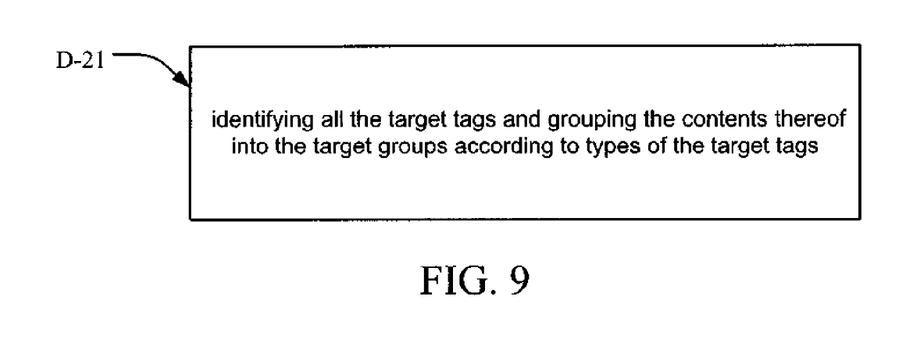
FIG. 9 shows a detail of the step D in FIG. 2 according to one embodiment of the present invention.

The Step E May Further Include:

(E-11) identifying the target group most related to the title of the HTML document by comparing correlation(s) between the target group(s) and the title; and (E-12) calculating similarities of the other target groups to the most title-related target group based on a vector space model to identify the target groups having the similarities higher than a predetermined threshold, and establishing the plain text document having the content of the identified target groups;

The title of the HTML document may be HTML Title tag, item title of RSS feed or summary of RSS feed.

In an alternative embodiment of the present invention, the grouping step D may include the step D-21 of identifying the contents near all the target tags and grouping the contents into different target groups according to the target tags. More specifically, the contents of the HTML elements of Paragraph are grouped in one target group while the contents of the HTML elements of Line Break are grouped in another target group.

For example, the rest of the HTML document after the pre-processing contains:

"<li>PPP</li>QQ<p>RR<p>SSS<h1>TITLE</h1><div><br>AAAAA</br><p>BBBBBBB</div><p>CCC<h2>DDD</h2><p>EEEEEEE<p>FFFF<div><li>TT</li><li>UUU</li><td>VVVVV</td><td>WWWW</td><td>XXXXX</td><li>YYY</li><li>ZZZZZ</li></div><br>GGGGG</br><br>HHHH</br>"

Figure 10:
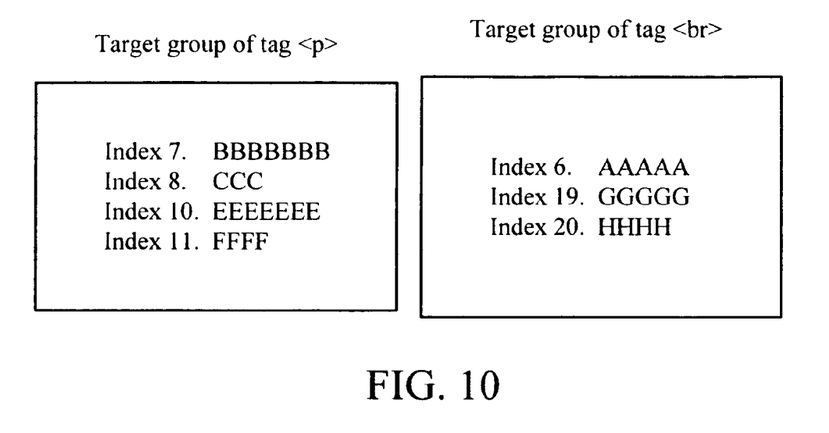
FIG. 10 shows examples of target groups according to one embodiment of the present invention.

After the step D-21, the grouping result is those shown in FIG. 10.

Figure 11:
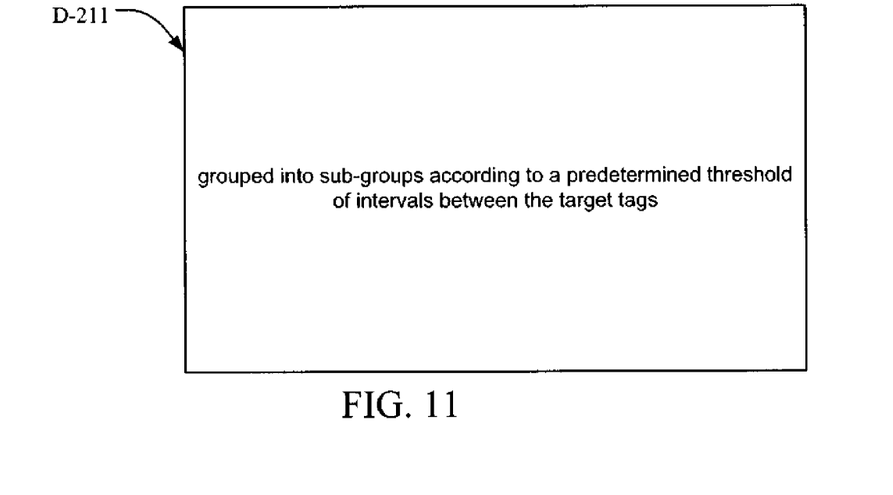
FIG. 11 shows a detail of the step D in FIG. 2 according to one embodiment of the present invention.
Figure 12:
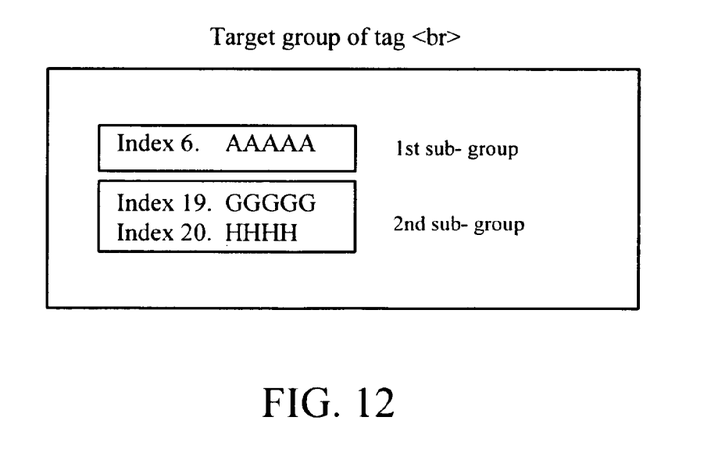
FIG. 12 shows examples of subgroups according to one embodiment of the present invention.

Since each of the target groups resulting from the step D-21 may contain contents belong to HTML elements having a large index difference with each other, it is necessary to further group them into sub-groups for identifying the relevant content more accurately. The further sub-grouping steps D-211 are shown in FIG. 11 and includes, in one of the target groups, identifying the first content as a base content and shifting a current HTML element to the base content, determining whether the index difference (interval) of the current HTML element and the HTML element next to the current HTML element is smaller than a predetermined threshold, if it is, shifting the current HTML element to the next HTML element and repeating the determining step, otherwise, grouping the contents of the HTML elements between the staring and current HTML element (including the starting and current HTML elements) into one of the sub-groups.

For example, the target group of the HTML element of <br> contains:

Index 6: AAA

Index 19: GGGGG

Index 20: HHHH

Since the index difference between the HTML elements with the content "AAA" and "GGGGG" is 13 which is larger than the predetermined threshold 10, they are further grouped into different subgroups. Since the index difference between the HTML elements with the content "GGGGG" and "HHHH" is 1 which is smaller than the predetermined threshold 10, they are further grouped into a the same subgroups. Thus, the target group of the HTML element of <br> is further grouped into a first subgroup containing "AAA" and a second subgroup containing "GGGGG" and "HHHH".

After the grouping step D-21, the result may be in the three following cases:

1. There are only target groups containing the HTML Paragraph elements,
2. There are only target groups containing the HTML Line Break elements, and
3. There are target groups containing the HTML Paragraph or Line Break elements.

Figure 13:
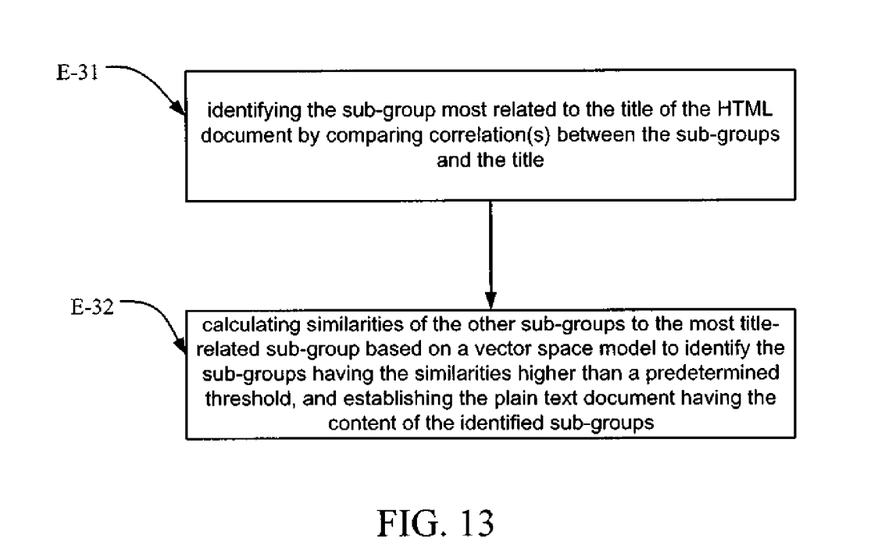
FIG. 13 shows a detail of the step E in FIG. 2 according to one embodiment of the present invention.

In the first and second cases, if there is no subgroups resulting from the sub-grouping step D-211, the content of the HTML Paragraph or Line Break elements are the content of the finally established plain text document, otherwise, correlation of these subgroups with the title of the HTML document or similarities based on vector space model of these subgroups to the title of the HTML document are calculated to identify the most relevant subgroups whose contents will be the content of the plain text document. More specifically, as shown in FIG. 13, the steps includes:

(E-31) identifying the sub-group most related to the title of the HTML document by comparing correlation(s) between the sub-groups and the title; and (E-32) calculating similarities of the other sub-groups to the most title-related sub-group based on a vector space model to identify the sub-groups having the similarities higher than a predetermined threshold, and establishing the plain text document having the content of the identified subgroups.

Figure 14:
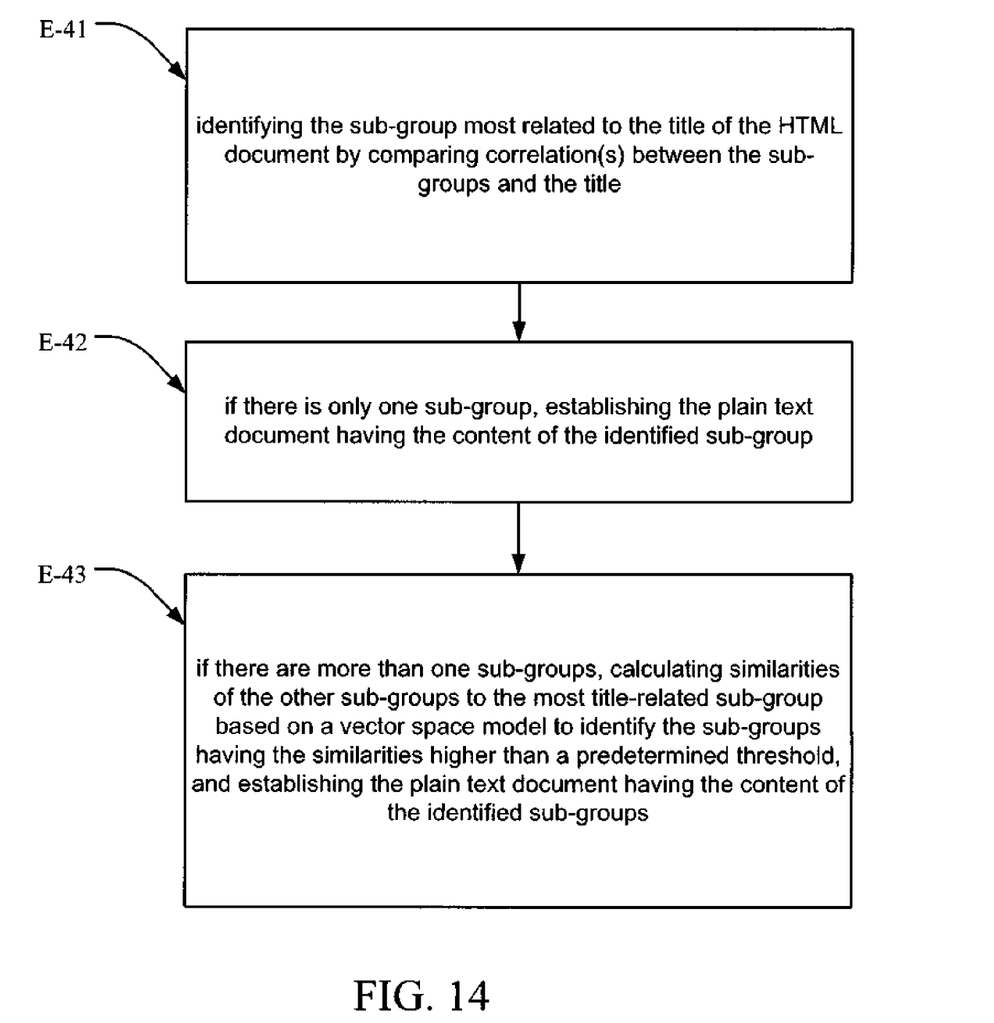
FIG. 14 shows a detail of the step E in FIG. 2 according to one embodiment of the present invention.

In the third case, the target groups will be processed by the steps shown in FIG. 14 which includes:

(E-41) identifying the sub-group most related to the title of the HTML document by comparing correlation(s) between the sub-groups and the title;

(E-42) if there is only one sub-group, establishing the plain text document having the content of the identified sub-group; and (E-43) if there are more than one sub-groups, calculating similarities of the other sub-groups to the most title-related sub-group based on a vector space model to identify the sub-groups having the similarities higher than a predetermined threshold, and establishing the plain text document having the content of the identified sub-groups.

Example

Title: "Box Office of Cape No. 7 Achieve More Than 300 Million NT Dollars!Staff Expect 400 Million More!"

Target Groups of Paragraph (<p>):

Subgroup 1:

"Cape No. 7 achieves a high popularity which does not cool down till now. The Box office of this movie accumulated until the last weekend has been up to 320 million NT dollars. This amount lets the movie ranking on the top of the Mandarin film this year and competing with Police Story 3: Super Cop cast by Jackie Chen 16 years ago. With a 300 million box office, we can infer that some audiences see this movie for 18 times."

Subgroup 2:

"Cape No. 7 becomes more and more popular around Taiwan and its box office is still increasing. Its box office accumulated until October 5 is up to 320 million NT dollars. Many young people in Taiwan like to talk about Cape No. 7. Now, the love story, songs and cast in the movie are the most popular things around Taiwan. This hot wave unceasingly pushes up the amount of its box office. The box office of Cape No. 7 has gone beyond the popular movies Red Cliff and Lust, Caution. With a 300 million box office, we can infer that there are 1 million audiences who has seen this movie in the theater and some of the audiences may have seen this movie for 18 times."

Target Groups of Line Break(<br>):

Subgroup 1:

"Jackson's 'This is It' out on DVD in January"
"Broadway shows returning to New Orleans"
"Kelsey Grammer is set for Broadway's 'La Cage"
"Chris Brown to appear on "20/20""
"Cape Jones announces spring tour"

Subgroup 2:

"Cape No. 7 Presented in L.A. film festival"
"US author Littell wins Bad Sex in fiction prize"
"Beautiful Sound in Cape No. 7—Tamio, a metro-sexual man"
"500 people Participate in the Last scene of Cape No. 7"
"Arabian Horse Foundation begins Swayze scholarship"

The above four subgroups are compared to the title of the HTML document, the same words presented in the subgroups and title are:

Subgroup 1 of the target group of Paragraph: (Cape, No., 7, 300, Million, NT, Dollar)

Subgroup 2 of the target group of Paragraph: (Cape, No., 7, 300, Million, NT, Dollar, More)

Subgroup 1 of the target group of Line Break: (Cape)

Subgroup 2 of the target group of Line Break: (Cape, No., 7)

Among the subgroups, the subgroup 2 of the target group of Paragraph has most same words with the title so that this subgroup is identified as most related to the title. The content of the subgroup 2 of the target group of Paragraph is the most relevant content.

If there are more than one sub-groups, calculating similarities of the other sub-groups to the most title-related sub-group based on a vector space model to identify the sub-groups having the similarities higher than a predetermined threshold, and establishing the plain text document having the content of the identified sub-groups. The predetermined threshold is preferably 0.6.

Since the target group of Paragraph has the subgroup 2 identified as most related to the title and has more than 1 subgroups, a vector space model is established for its subgroups. Three keywords "Box Office", "Cape No. 7" and "Taiwan" are identified in the two subgroups. The vector of subgroup 1 is (2,1,0) since the keywords "Box Office", "Cape No. 7" and "Taiwan" respectively present in the subgroup 1 for 2, 1 and 0 times. The vector of subgroup 2 is (5,3,3) since the keywords "Box Office", "Cape No. 7" and "Taiwan" respectively present in the subgroup 2 for 5, 3 and 3 times. The similarity between the two subgroups is calculated by the following equation:

$$\frac{\vec{v}_1 \cdot \vec{v}_2}{|\vec{v}_1||\vec{v}_2|} = \frac{2 \times 5 + 1 \times 3 + 0 \times 3}{\sqrt{2^2 + 1^2 + 0^2} \times \sqrt{5^2 + 3^2 + 3^2}} = 0.873334$$

Thus, the similarity between the subgroups 1 and 2 is larger than 0.6 and the content of the subgroup 1 is also extracted.

Figure 15:
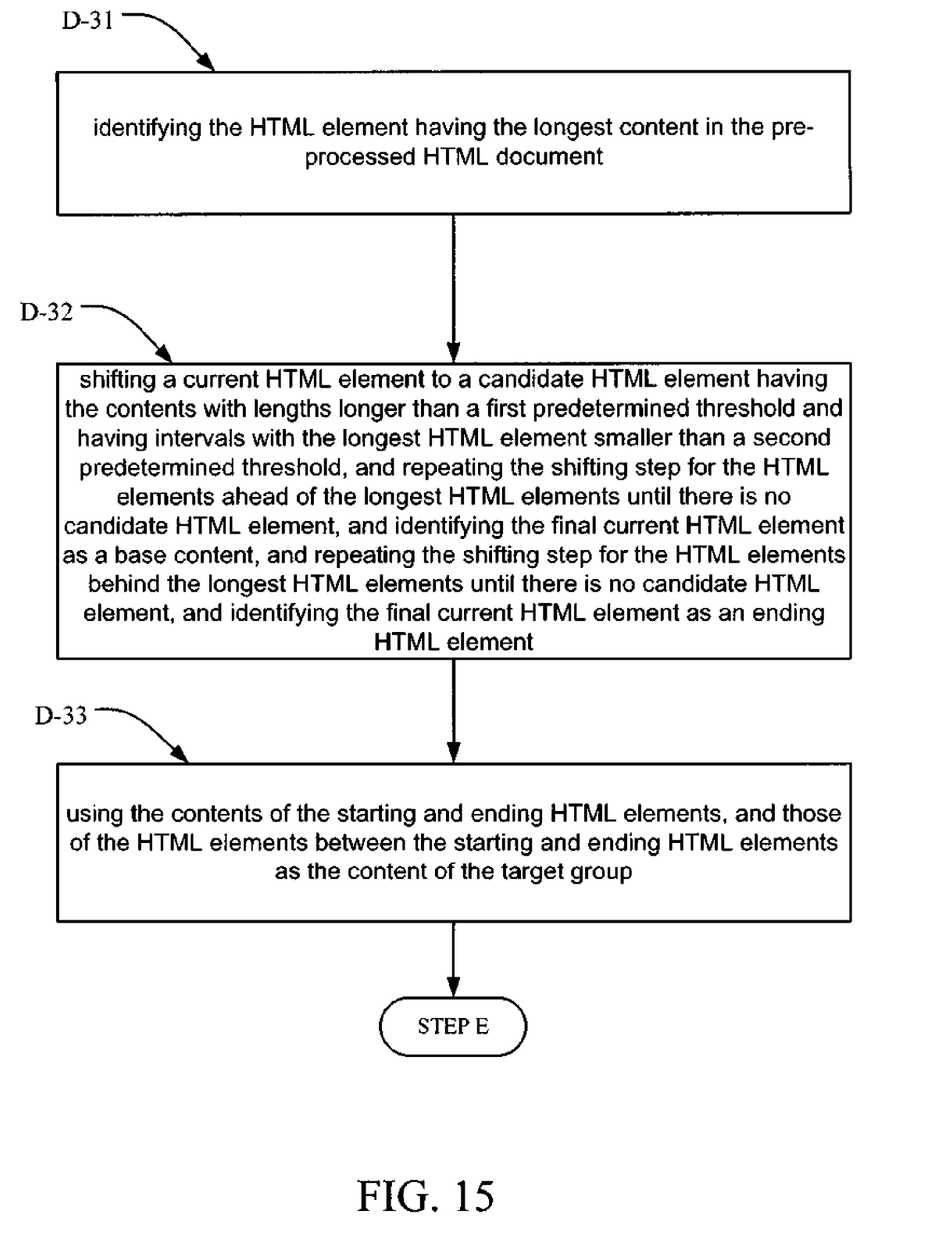
FIG. 15 shows a detail of the step D in FIG. 2 according to one embodiment of the present invention.

FIG. 15 shows a flowchart of a method of grouping according to another alternative embodiment of the present invention. A specific searching method for longest content is used. This grouping method includes the steps of:

(D-31) identifying the HTML element having the longest content in the pre-processed HTML document;

(D-32) shifting a current HTML element to a candidate HTML element having the contents with lengths longer than a first predetermined threshold and having intervals with the longest HTML element smaller than a second predetermined threshold, and repeating the shifting step for the HTML elements ahead of the longest HTML elements until there is no candidate HTML element, and identifying the final current HTML element as a base content, and repeating the shifting step for the HTML elements behind the longest HTML elements until there is no candidate HTML element, and identifying the final current HTML element as an ending HTML element; and (D-33) using the contents of the starting and ending HTML elements, and those of the HTML elements between the starting and ending HTML elements as the content of the target group.

While the invention has been described in detail and with reference to specific examples thereof, it will be apparent to one skilled in the art that various changes and modifications can be made therein without departing from the spirit and scope thereof.

What is claimed is:

1. A method of establishing a plain text document from a HTML document, comprising the steps of:

(A) acquiring a HTML document defined by HTML elements, each HTML element composed of tags and content between the tags;
(B) pre-processing the HTML document by omitting some of the HTML elements, whereby the rest of the HTML document comprises at least one target tag and at least one corresponding content;
(C) using a data structure to store the remaining tags of the pre-processed HTML document;
(D) grouping the remaining HTML elements with the remaining tags stored in the data structure of the pre-processed HTML document into at least one target group according to the target tag(s), the step (D) further comprises the steps of:
(D-11) sequentially searching for a first content near the target tag from the rest of the HTML document, and identifying the first content as a first base content;
(D-12) sequentially searching for next content near the target tag from the first base content, and if there is no next content near the target tag, implementing the step (D-15);
(D-13) if an interval between the next content of the step (D-12) and the base content is smaller than a predetermined threshold, identifying the next content of the step (D-12) as a current base content, and repeating the step (D-12), otherwise, implementing the step (D-14);
(D-14) grouping the first content and the current base content(s) into a target group, and identifying the next content as another first base content, implementing the step (D-12); and
(D-15) grouping the first base content into one of the target groups; and
(E) identifying the target group(s) most related to a title of the HTML document by comparing correlation(s) between the target group(s) and the title, and establishing a plain text document having the content of the identified target group.

2. The method of establishing a plain text document from a HTML document as claimed in claim 1, wherein blank lines, tags <!-- -->, <script>, </script>, <style>, </style>, <a>, </a>, <span>, </span> and <img>, and the content in the tag <!-- -->, the content between the tags <script> and </script>, and the content between the tags <style> and </style> are omitted in the pre-processing step while the content between tags <body> and </body> is retained in the pre-processed HTML document.

3. The method of establishing a plain text document from a HTML document as claimed in claim 1, wherein the data structure further stores an information about the rest of the HTML document of the pre-processed HTML document.

4. The method of establishing a plain text document from a HTML document as claimed in claim 3, wherein the information comprises indices of the HTML elements, lengths of the contents of the HTML elements and indications of the target tags.

5. The method of establishing a plain text document from a HTML document as claimed in claim 3 further comprises the step of identifying the title of the HTML document using the information stored in the data structure, and deleting the information about the HTML element containing the title and the information about the HTML element(s) ahead of the HTML element containing the title from the data structure before the step (D).

6. The method of establishing a plain text document from a HTML document as claimed in claim 1, wherein the predetermined threshold is 1~5.

7. The method of establishing a plain text document from a HTML document as claimed in claim 1, wherein the step (D) further comprises the step of:
(D-21) identifying the contents near all the target tags and grouping the contents into different target groups according to the target tags.

8. The method of establishing a plain text document from a HTML document as claimed in claim 7, wherein each of the target groups are further grouped into sub-groups according to a predetermined threshold of intervals between the target tags.

9. The method of establishing a plain text document from a HTML document as claimed in claim 8, wherein the predetermined threshold is from 1 to 10.

10. The method of establishing a plain text document from a HTML document as claimed in claim 1, wherein the contents of the HTML elements identified by a specific searching method are used as the content of the target group(s) if there is no target tag in the pre-processed HTML document.

11. The method of establishing a plain text document from a HTML document as claimed in claim 10, wherein the searching method comprises the steps of:
identifying the HTML element having the longest content in the pre-processed HTML document;
shifting a current HTML element to a candidate HTML element having the contents with lengths longer than a first predetermined threshold and having intervals with the longest HTML element smaller than a second predetermined threshold;
repeating the shifting step for the HTML elements ahead of the longest HTML elements until there is no candidate HTML element, and identifying the final current HTML element as a base content, and repeating the shifting step for the HTML elements behind the longest HTML elements until there is no candidate HTML element, and identifying the final current HTML element as an ending HTML element; and
using the contents of the starting and ending HTML elements, and those of the HTML elements between the starting and ending HTML elements as the content of the target group.

12. The method of establishing a plain text document from a HTML document as claimed in claim 11, wherein the second threshold ranges from 1 to 10.

13. The method of establishing a plain text document from a HTML document as claimed in claim 1, wherein the target tags comprise tags <p> and <br>.

14. A method of establishing a plain text document from a HTML document, comprising the steps of:
(A) acquiring a HTML document defined by HTML elements, each composed of tags and content between the tags;
(B) pre-processing the HTML document by omitting some of the HTML elements, whereby the rest of the HTML document comprises at least one target tag and at least one corresponding content;
(C) using a data structure to store the remaining tags of the pre-processed HTML document;
(D) grouping the remaining HTML elements with the remaining tags stored in the data structure of the pre-processed HTML document into at least one target group according to the target tag(s);
(E) identifying the target group(s) most related to a title of the HTML document by comparing correlation(s) between the target group(s) and the title, and establishing a plain text document having the content of the identified target group, wherein the target group(s) most related to the title of the HTML document is identified by the steps:

(E-1) if there is no sub-group in the target group(s), identifying the target group most related to the title of the HTML document by comparing correlation(s) between the target group(s) and the title;

(E-2) calculating similarities of the target groups not be identified in the step (E-1) to the most title-related target group based on a vector space model to identify the target groups having the similarities higher than a predetermined threshold, and establishing the plain text document having the content of the identified target groups;

(E-3) if there is (are) sub-group(s) in the target group(s), identifying the sub-group most related to the title of the HTML document by comparing correlation(s) between the sub-groups and the title;

(E-4) if there is only one sub-group, establishing the plain text document having the content of the identified sub-group; and (E-5) if there are more than one sub-groups, calculating similarities of the other sub-groups to the most title-related sub-group based on a vector space model to identify the sub-groups having the similarities higher than a predetermined threshold, and establishing the plain text document having the content of the identified sub-groups.

15. The method of establishing a plain text document from a HTML document as claimed in claim 14, wherein the predetermined threshold is 0.6.

* * * * *